United States Patent
Gong et al.

(10) Patent No.: US 10,871,097 B2
(45) Date of Patent: Dec. 22, 2020

(54) $NH_3$ SLIP DETECTION USING $NO_x$ SENSOR

(71) Applicant: Cummins Emission Solutions Inc., Columbus, IN (US)

(72) Inventors: Jinqian Gong, Columbus, IN (US); Varun R. Rajagopal, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 35 days.

(21) Appl. No.: 16/312,170

(22) PCT Filed: Jun. 27, 2017

(86) PCT No.: PCT/US2017/039479
§ 371 (c)(1),
(2) Date: Dec. 20, 2018

(87) PCT Pub. No.: WO2018/005474
PCT Pub. Date: Jan. 4, 2018

(65) Prior Publication Data
US 2019/0203624 A1    Jul. 4, 2019

Related U.S. Application Data

(60) Provisional application No. 62/355,708, filed on Jun. 28, 2016.

(51) Int. Cl.
*F01N 3/20* (2006.01)
*B01D 53/94* (2006.01)
*F01N 3/035* (2006.01)

(52) U.S. Cl.
CPC ......... *F01N 3/208* (2013.01); *B01D 53/9495* (2013.01); *F01N 3/035* (2013.01);
(Continued)

(58) Field of Classification Search
CPC combination set(s) only.
See application file for complete search history.

(56) References Cited

U.S. PATENT DOCUMENTS 7,707,824 B2    5/2010 Solbrig
8,281,578 B2    10/2012 Upadhyay et al.
(Continued)

OTHER PUBLICATIONS

International Search Report and Written Opinion issued for PCT/US2017/039479, dated Sep. 6, 2017, 13 pages.

*Primary Examiner* — Binh Q Tran
(74) *Attorney, Agent, or Firm* — Foley & Lardner LLP

(57) ABSTRACT

System and methods for detecting $NH_3$ slip using cross-sensitivity of an $NO_x$ sensor may include accessing a temperature value for a catalyst and determining the temperature value for the catalyst exceeds a predetermined value. If the temperature exceeds the predetermined value, a system-out $NO_x$ measurement signal from the system-out $NO_x$ sensor and an estimated system-out $NO_x$ value are used to calculate a delta value. A flag is set indicative of $NH_3$ slip for an exhaust system responsive to an average of delta values for a predetermined period of time exceeding a predetermined value. If the temperature does not exceed the predetermined value, then an average of a plurality of system-out $NO_x$ measurement signals can be calculated and a flag is set indicative of $NH_3$ slip responsive to the calculated average for a predetermined period of time exceeding a predetermined value.

18 Claims, 6 Drawing Sheets

(52) U.S. Cl.
CPC ........ *F01N 3/2066* (2013.01); *B01D 53/9477* (2013.01); *F01N 2560/026* (2013.01); *F01N 2610/02* (2013.01); *F01N 2900/0408* (2013.01); *F01N 2900/0412* (2013.01); *F01N 2900/1602* (2013.01); *F01N 2900/1616* (2013.01); *F01N 2900/1626* (2013.01); *Y02T 10/12* (2013.01)

(56) References Cited

U.S. PATENT DOCUMENTS

| | | |
|---|---|---|
| 8,607,548 B2 | 12/2013 | Zayan |
| 8,745,970 B2 | 6/2014 | Gonze et al. |
| 8,793,980 B2 | 8/2014 | He et al. |
| 8,800,272 B2 | 8/2014 | Brahma et al. |
| 8,863,503 B2 | 10/2014 | Yasui |
| 9,404,405 B2 * | 8/2016 | Nakamura ............ F01N 3/0828 |
| 9,476,341 B2 | 10/2016 | Whitt et al. |
| 9,987,626 B2 * | 6/2018 | Guo .................... B01J 35/0006 |
| 2005/0282285 A1 | 12/2005 | Radhamohan et al. |
| 2009/0185954 A1 * | 7/2009 | Qi ........................... F01N 3/208 422/62 |
| 2011/0185707 A1 | 8/2011 | Upadhyay et al. |
| 2011/0258992 A1 | 10/2011 | Gonze et al. |
| 2013/0064717 A1 * | 3/2013 | Masaki .................. F01N 3/208 422/108 |
| 2014/0301925 A1 | 10/2014 | Korpics et al. |
| 2015/0226102 A1 | 8/2015 | Hsieh et al. |
| 2016/0281569 A1 * | 9/2016 | Wei ........................ F01N 3/208 |
| 2016/0312720 A1 | 10/2016 | Fukui et al. |
| 2017/0051654 A1 * | 2/2017 | Gupta .................... F01N 3/035 |
| 2017/0122159 A1 * | 5/2017 | Bahrami ................ F01N 3/103 |

\* cited by examiner

NH₃ SLIP DETECTION USING NOₓ SENSOR

CROSS-REFERENCE TO RELATED APPLICATIONS

The present application is a U.S. National Stage Application of PCT Application No. PCT/US2017/039479, filed on Jun. 27, 2017, which claims the benefit of priority to U.S. Provisional Application No. 62/355,708, filed on Jun. 28, 2016. The contents of both applications are incorporated herein by reference in their entireties.

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a SCR process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia or urea, is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system up-stream of the catalyst chamber. The SCR system may include one or more sensors to monitor conditions within the exhaust system.

SUMMARY

Implementations described herein relate to $NH_3$ slip detection using a system-out $NO_x$ sensor.

One implementation relates to a method for detecting $NH_3$ slip using a system-out $NO_x$ sensor. The method includes accessing a temperature value for a catalyst, determining the temperature value for the catalyst exceeds a predetermined value, determining one or more prerequisite conditions are met, accessing a system-out $NO_x$ measurement signal from the system-out $NO_x$ sensor, determining an estimated system-out $NO_x$ value, calculating a delta value based on the system-out $NO_x$ measurement signal and the estimated system-out $NO_x$ value, and setting a flag indicative of $NH_3$ slip for an exhaust system responsive to an average of delta values, including the calculated delta value, for a predetermined period of time exceeding a predetermined value.

In some implementations, the one or more prerequisite conditions include determining a correlation between the system-out $NO_x$ measurement signal and an engine-out $NO_x$ measurement signal. In some implementations, the one or more prerequisite conditions include determining a motoring or idling event has not occurred. In some implementations, the one or more prerequisite conditions include the system-out $NO_x$ measurement signal exceeding a predetermined value. In some implementations, determining the estimated system-out $NO_x$ value is based on a filtered system-out $NO_x$ measurement signal. In some implementations, the predetermined temperature value is 300 degrees Celsius. In some implementations, calculating the delta value comprises a difference between the system-out $NO_x$ measurement signal and the estimated system-out $NO_x$ value.

Another implementation relates to a method for detecting $NH_3$ slip using a system-out $NO_x$ sensor. The method includes accessing a temperature value for a catalyst, determining the temperature value for the catalyst is below a predetermined value, determining one or more prerequisite conditions are met, accessing a plurality of system-out $NO_x$ measurement signals, calculating an average of the plurality of system-out $NO_x$ measurement signals, and setting a flag indicative of $NH_3$ slip for an exhaust system responsive to the calculated average of the plurality of system-out $NO_x$ measurement signals for a predetermined period of time exceeding a predetermined value.

In some implementations, the one or more prerequisite conditions include determining a correlation between the system-out $NO_x$ measurement signal and an engine-out $NO_x$ measurement signal. In some implementations, the predetermined temperature value is 300 degrees Celsius. In some implementations, the plurality of system-out $NO_x$ measurement signals are received from the system-out $NO_x$ sensor.

Yet another implementation relates to a system that includes an exhaust aftertreatment system with a catalyst and a system-out $NO_x$ sensor. The system also includes a controller that is configured to access a temperature value for the catalyst, determine the temperature value for the catalyst exceeds a predetermined value, determine one or more first prerequisite conditions are met, access a system-out $NO_x$ measurement signal from the system-out $NO_x$ sensor, determine an estimated system-out $NO_x$ value, calculate a delta value based on the system-out $NO_x$ measurement signal and the estimated system-out $NO_x$ value, and set a flag indicative of $NH_3$ slip for the exhaust aftertreatment system responsive to an average of delta values, including the calculated delta value, for a predetermined period of time exceeding a predetermined value.

In some implementations, the one or more first prerequisite conditions include determining a correlation between the system-out $NO_x$ measurement signal and an engine-out $NO_x$ measurement signal. In some implementations, the one or more first prerequisite conditions include determining a motoring or idling event has not occurred. In some implementations, the one or more first prerequisite conditions include the system-out $NO_x$ measurement signal exceeding a predetermined value. In some implementations, determining the estimated system-out $NO_x$ value is based on a filtered system-out $NO_x$ measurement signal. In some implementations, calculating the delta value comprises a difference between the system-out $NO_x$ measurement signal and the estimated system-out $NO_x$ value. In some implementations, the controller is further configured to determine the temperature value for the catalyst is below a predetermined temperature value, determine one or more second prerequisite conditions are met, access a plurality of system-out $NO_x$ measurement signals, calculate an average of the plurality of system-out $NO_x$ measurement signals, and set the flag indicative of $NH_3$ slip for the exhaust aftertreatment system responsive to the calculated average of the plurality of system-out $NO_x$ measurement signals for a predetermined period of time exceeding a second predetermined value. In some implementations, the one or more second prerequisite conditions include determining a correlation between the system-out $NO_x$ measurement signal and an engine-out $NO_x$ measurement signal. In some implementations, the predetermined temperature value is 300 degrees Celsius.

BRIEF DESCRIPTION

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for $NH_3$ slip detection using a system-out $NO_x$ sensor. The various concepts introduced above and discussed in greater detail below may be implemented in any of numerous ways, as the described concepts are not limited to any particular manner of implementation. Examples of specific implementations and applications are provided primarily for illustrative purposes.

I. Overview

In some exhaust systems, a sensor module may be located downstream of an SCR catalyst to detect one or more emissions in the exhaust flow after the SCR catalyst. For example, a $NO_x$ sensor may be positioned downstream of the SCR catalyst to detect $NO_x$ within the exhaust gas exiting the exhaust of the vehicle. Such emission sensors may be useful to provide feedback to a controller to modify an operating parameter of the aftertreatment system of the vehicle. For example, a $NO_x$ sensor may be utilized to detect the amount of $NO_x$ exiting the vehicle exhaust system and, if the $NO_x$ detected is too high or too low, the controller may modify an amount of reductant delivered by a dosing module.

In some instances, other sensors may be included to detect other compounds, such as an $NH_3$ sensor. However, such sensors may add cost and complexity to the system. Accordingly, it may be useful to utilize the cross-sensitivity of a $NO_s$ sensor to detect when $NH_3$ slip occurs.

II. Overview of Aftertreatment System

Figure 1:
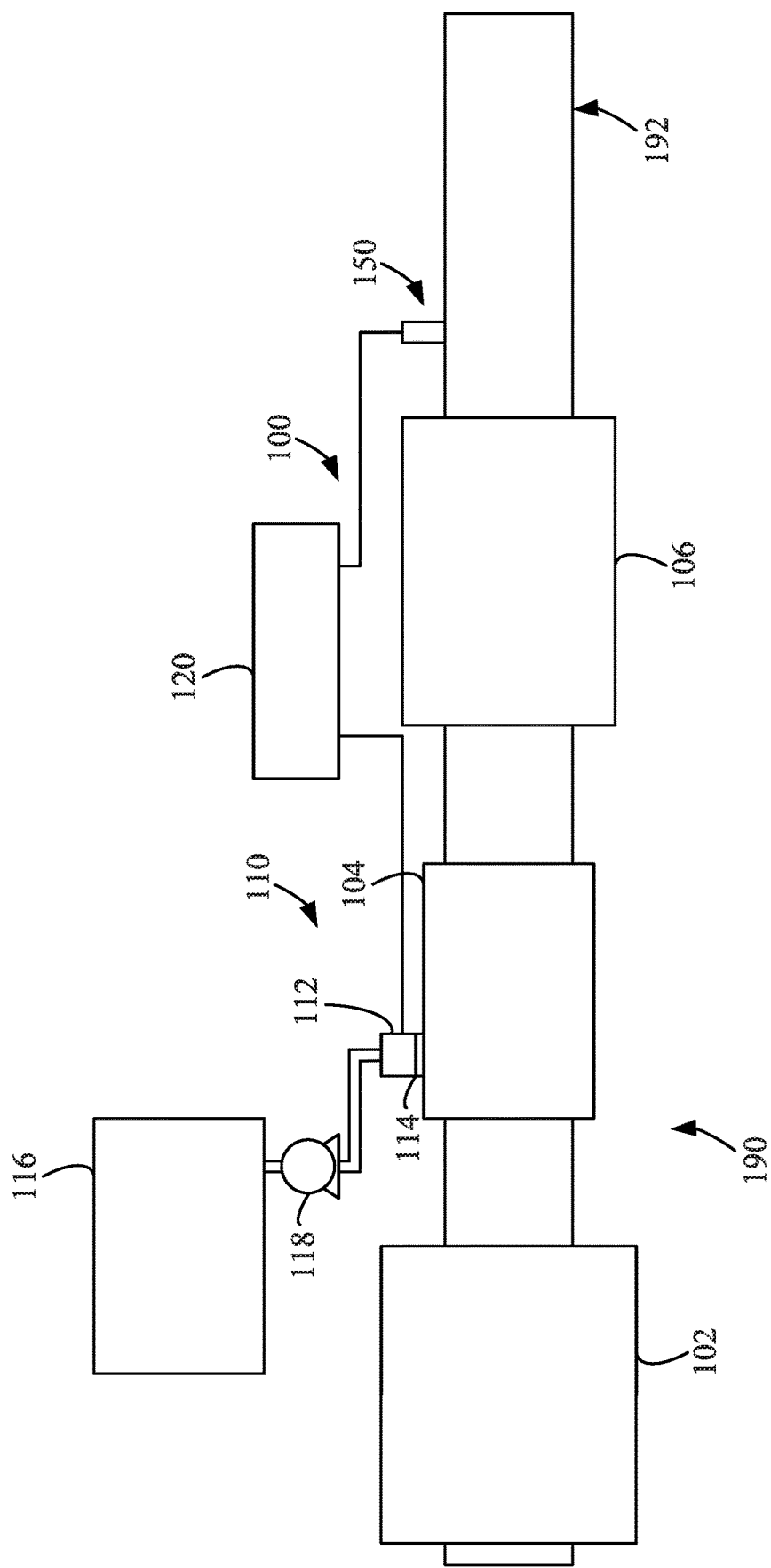
FIG. 1 is a block schematic diagram of an example selective catalytic reduction system having an example reductant delivery system for an exhaust system.

FIG. 1 depicts an aftertreatment system 100 having an example reductant delivery system 110 for an exhaust system 190. The aftertreatment system 100 includes a diesel particulate filter (DPF) 102, the reductant delivery system 110, a decomposition chamber or reactor 104, a SCR catalyst 106, and a sensor 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea, aqueous ammonia, or diesel exhaust fluid (DEF), into ammonia. The decomposition chamber 104 includes a reductant delivery system 110 having a dosing module 112 configured to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 to which the dosing module 112 is mounted. The dosing module 112 is fluidly coupled to one or more reductant sources 116. In some implementations, a pump 118 may be used to pressurize the reductant from the reductant source 116 for delivery to the dosing module 112.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

Figure 6:
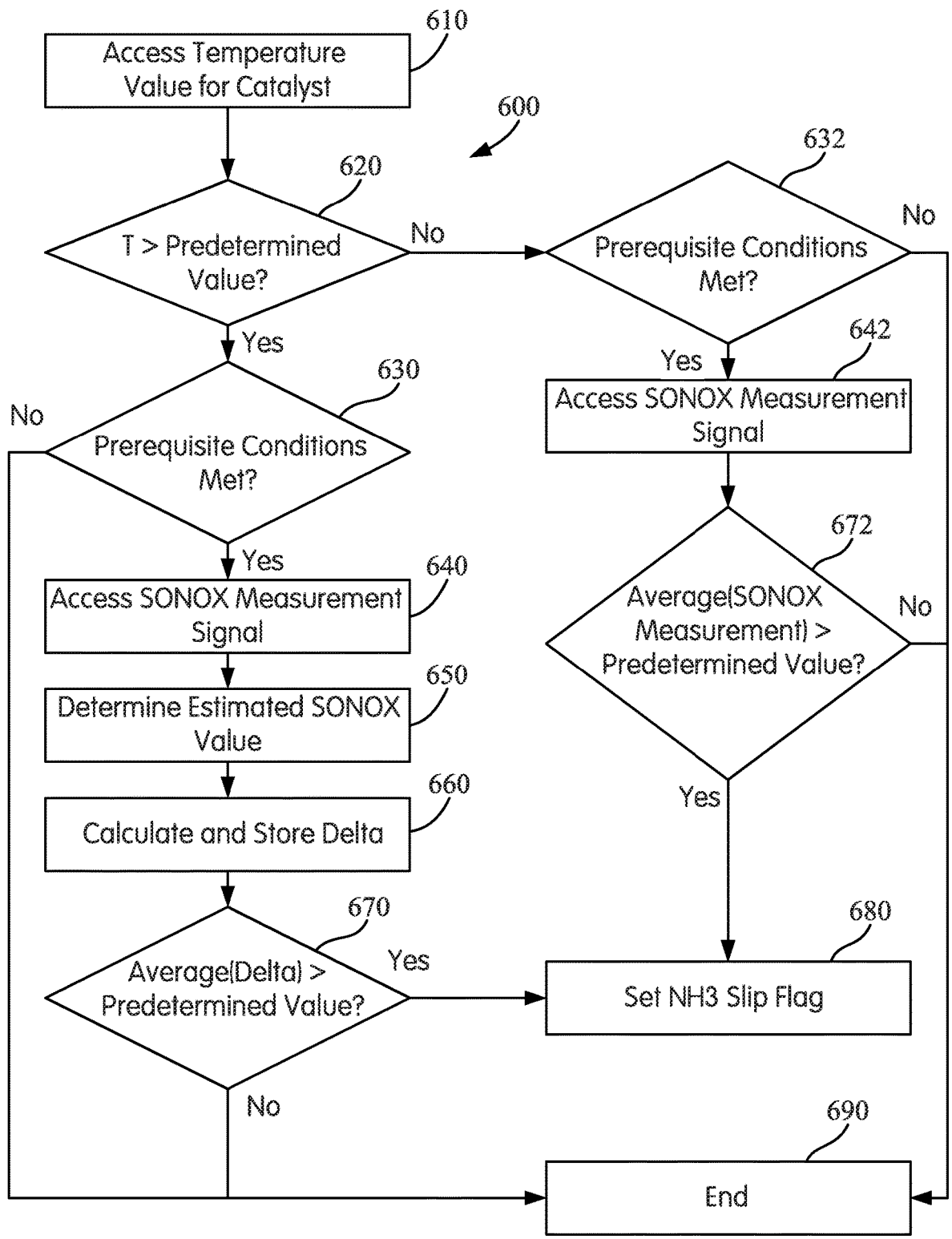
FIG. 6 is a process diagram for detecting $NH_3$ slip using a system-out $NO_x$ sensor.

In certain implementations, the controller 120 is structured to perform certain operations, such as those described herein in relation to FIG. 6. In certain implementations, the controller 120 forms a portion of a processing subsystem including one or more computing devices having memory, processing, and communication hardware. The controller 120 may be a single device or a distributed device, and the functions of the controller 120 may be performed by hardware and/or as computer instructions on a non-transient computer readable storage medium.

In certain implementations, the controller 120 includes one or more modules or circuits structured to functionally execute the operations of the controller 120. In certain implementations, the controller 120 may include a $NO_x$ value correction module for performing the operations described in reference to FIG. 6. The description herein including modules emphasizes the structural independence of the aspects of the controller 120 and illustrates one grouping of operations and responsibilities of the controller 120. Other groupings that execute similar overall operations are understood within the scope of the present application. Modules may be implemented in hardware and/or as computer instructions on a non-transient computer readable storage medium, and modules may be distributed across various hardware or computer based components. More specific descriptions of certain embodiments of controller operations are included in the section referencing FIG. 6.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust system 190.

The exhaust system 190 may further include a diesel oxidation catalyst (DOC) in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber or reactor pipe 104. For instance, the DPF 102 and the SCR catalyst 106 may be combined into a single unit, such as an SDPF. In some implementations, the dosing module 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190, such as a tip of the sensor 150 may extend into a portion of the exhaust system 190. In other implementations, the sensor 150 may receive exhaust gas through another conduit, such as a sample pipe extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensor 150 may be utilized for detecting a condition of the exhaust gas, such as two, three, four, five, or size sensor 150 with each sensor 150 located at one of the foregoing positions of the exhaust system 190.

III. Implementations of $NH_3$ Slip Detection Using $NO_x$ Sensor

Described herein are methods and systems for $NH_3$ or ammonia slip detection using a $NO_x$ sensor. The ammonia slip detection may be dependent upon a temperature of an SCR catalyst.

A first method is applicable for when the SCR catalyst has a high temperature, such as above 300° C. The method includes tracking a difference between an unfiltered system-out $NO_x$ (SONOX) measurement signal, such as from a $NO_x$ sensor downstream of the SCR catalyst similar to sensor 150 of FIG. 1, and an estimated SONOX signal. A $NO_x$ sensor may be cross-sensitive to $NH_3$, such as due to the detection material used. When there is a release of $NH_3$ at the tailpipe, the cross-sensitivity of the $NO_x$ sensor towards $NH_3$ causes the measured SONOX output to rise sharply in response. The SONOX measurement signal will rise faster than the estimated SONOX signal, thus leading to a sharp increase in the difference, or delta, between the two signals. Because large $NH_3$ slip at the tailpipe tends to decay much slower than a sudden tailpipe $NO_x$ increase, a large delta between the raw SONOX measurement and the estimated SONOX value over a predetermined period of time is indicative of $NH_3$ slip.

Figure 2:
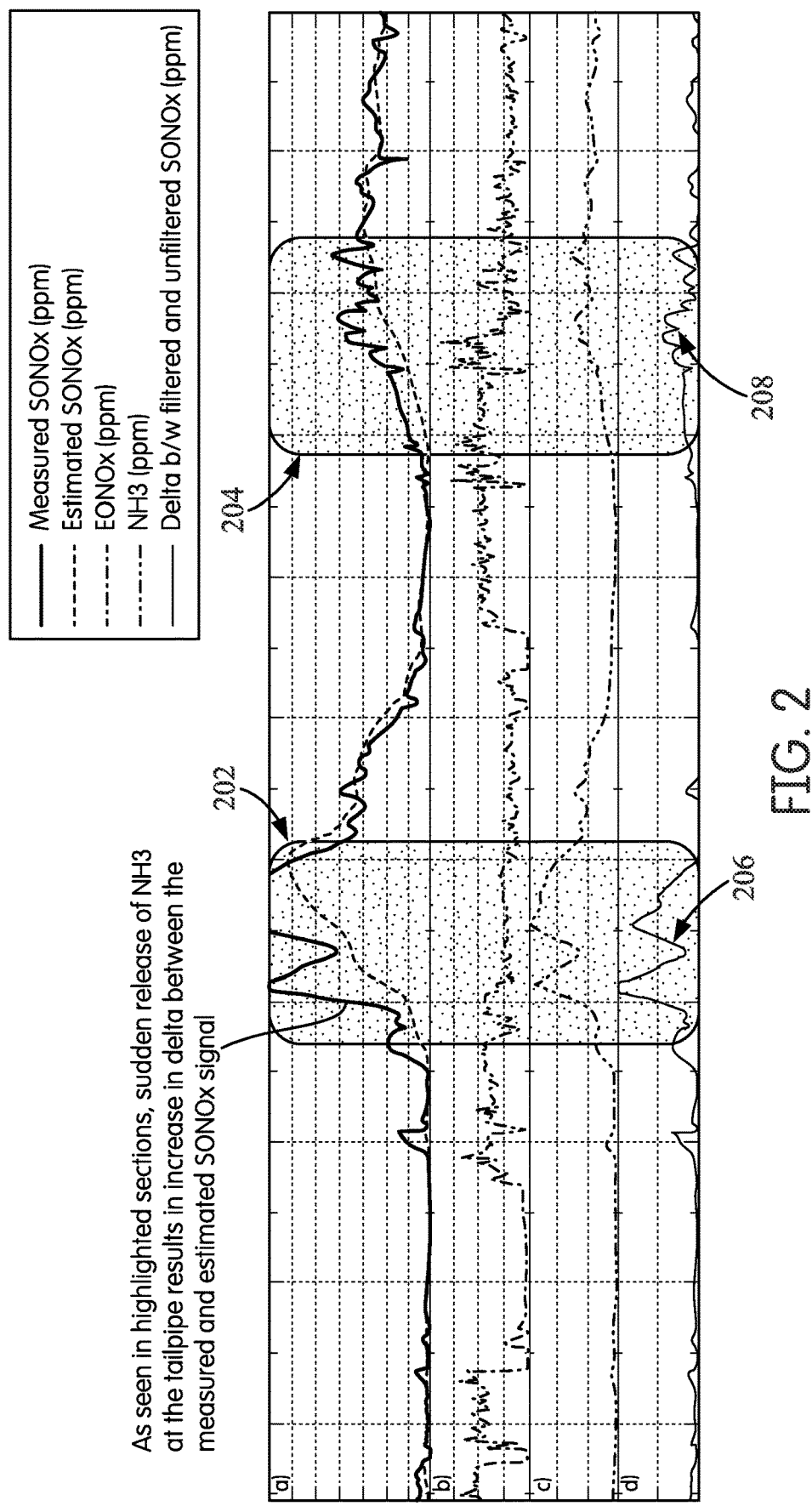
FIG. 2 is a graphical diagram depicting increases in a delta value between a measured SONOX signal and an estimated SONOX value indicative of $NH_3$ slip using a system-out $NO_x$ sensor.

A controller, such as controller 120 of FIG. 1, receives the raw SONOX measurement signal from the $NO_x$ sensor and calculates an estimated SONOX value. The estimated SONOX value can be calculated by using a filtered SONOX measurement value. The controller then determines a difference or delta between the unfiltered SONOX measurement signal and an estimated SONOX value. The controller stores the determined difference value over a period of time. When there is a sudden release of $NH_3$ at the tailpipe, the cross-sensitivity of the $NO_x$ sensor towards $NH_3$ will cause the measured SONOX output value to rise sharply in response over a short period of time. The unfiltered SONOX measurement signal will rise much faster than the estimated SONOX value, thus leading to a sharp increase in the delta between the two values. Referring to the FIG. 2, the highlighted sections 202, 204 depict such increases in the delta 206, 208 between the measured SONOX signal and the estimated SONOX value. Because large $NH_3$ slip at the tailpipe tends to decay much slower than a sudden tailpipe $NO_x$ increase, a large enough delta that is sustained over a predetermined period of time (such as using an average of the stored delta values exceeding a predetermined value) can be used to detect $NH_3$ slip. When the SONOX measurement signal increases, the estimated SONOX value increases at a lower rate. If the SONOX measurement signal drops to a value below the estimated SONOX value, the estimated SONOX value is reset to the current value of the SONOX measurement signal.

Figure 3:
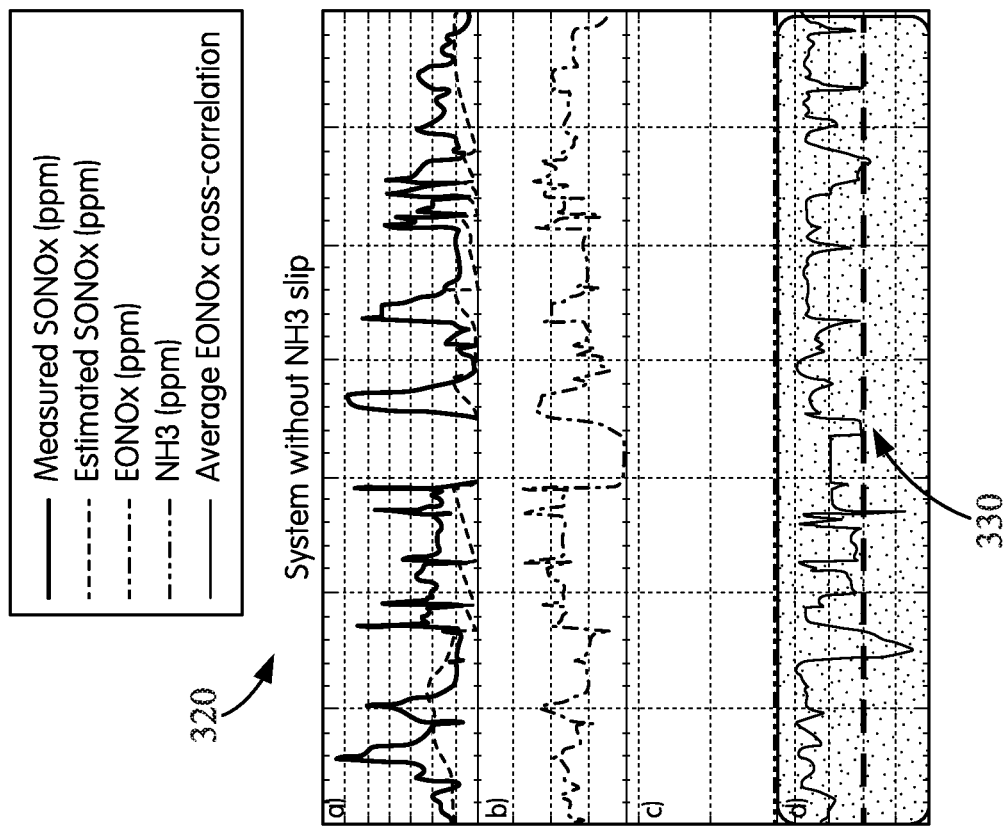
FIG. 3 is a graphical diagram depicting correlation values between a measured SONOX signal and an engine-out $NO_x$ measurement signal as a prerequisite condition to detecting $NH_3$ slip using a system-out $NO_x$ sensor.
Figure 3:
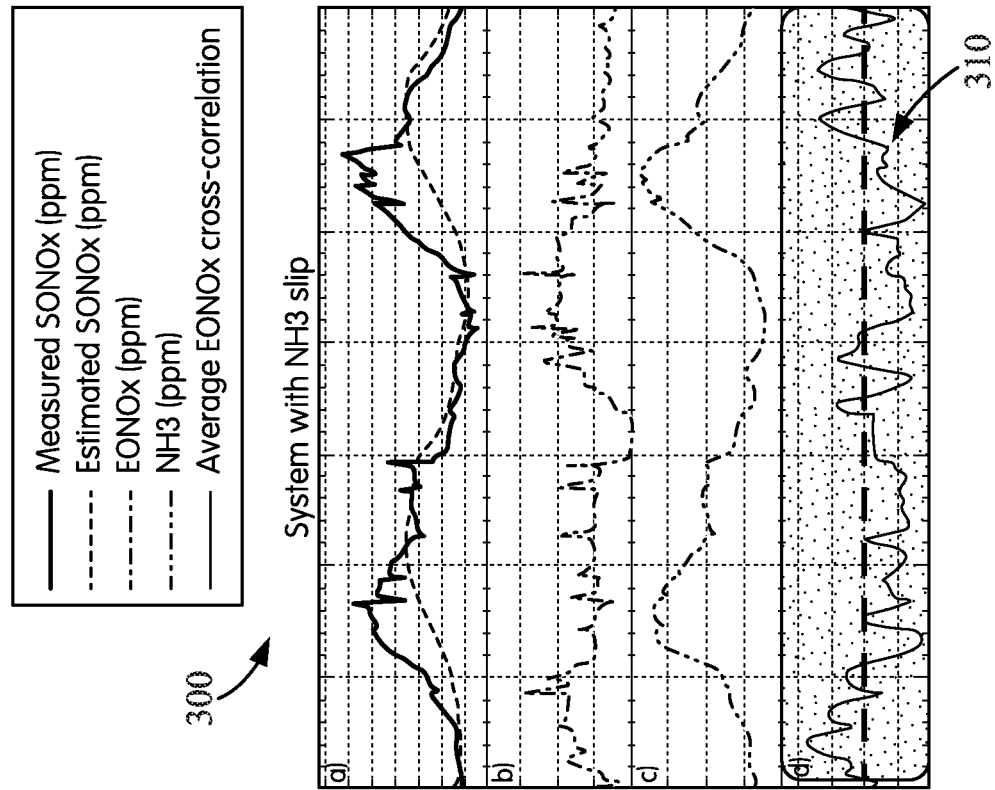

In some implementations, prerequisite conditions may need to be satisfied to distinguish between conditions that cause increased delta between a SONOX measurement signal and an estimated SONOX value before utilizing the cross-sensitivity of the $NO_x$ sensor to detect $NH_3$ slip and/or setting a flag indicating $NH_3$ slip has occurred. A first prerequisite condition to be met is that the SONOX measurement signal differs from the engine-out $NO_x$ measurement signal by a predetermined amount and/or does not correlate well with the engine-out $NO_x$ measurement. As shown in FIG. 3, a system 300 that is slipping $NH_3$ at the tailpipe has a lower degree of cross-correlation 310 between the engine-out $NO_x$ and SONOX measurement signals in comparison to a degree of cross-correlation 330 between the engine-out $NO_x$ and SONOX measurement signals a system 320 that is not slipping $NH_3$. The amount of offset that is introduced by the $NH_3$ slip on the SONOX measurement signal lowers the degree of correlation, as the measured SONOX signal is larger than the engine-out $NO_x$ signal due to the cross-sensitivity of the SONOX sensor to the increased $NH_3$. Thus if the degree of correlation is persistently higher than expected for a predetermined amount of time, then $NH_3$ slip detection can be paused and/or a flag value of 0 (or conversely 1, depending on the implementation) may be set for a variable for the cross-correlation prerequisite.

Figure 4:
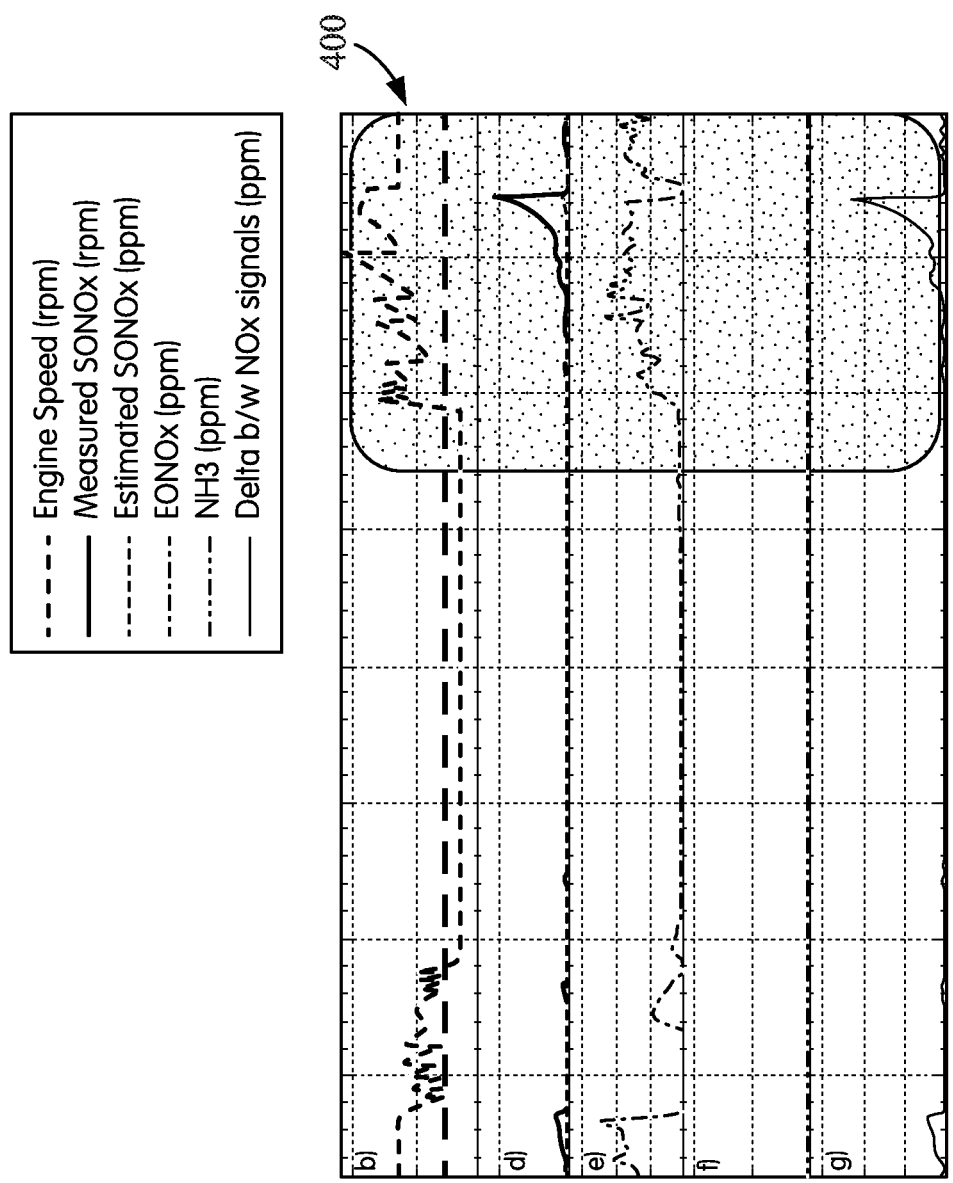
FIG. 4 is a graphical diagram depicting increases in a delta value between a measured SONOX signal and an estimated SONOX value after a motoring or idling event as a prerequisite condition to detecting $NH_3$ slip using a system-out $NO_x$ sensor.

Another prerequisite condition may include the engine not operating in long motoring or idling events. A motoring or idling event of a predetermined length will involve engine out $NO_x$ dropping to very low levels, accompanied by a consequent drop of SONOX to very low levels. During the long motoring event, the dosing is at a minimal level due to the lack of engine-out $NO_x$ entering the system, causing depletion of $NH_3$ storage in the SCR during a long motoring event. At the end of a long motoring/idling event, when there is a sudden increase in the level of engine-out $NO_x$, the SCR may not reduce $NO_x$ efficiently due to the depleted $NH_3$ storage conditions, thus leading to a sudden increase in the level of SONOX, as shown in the highlighted portion 400 of FIG. 4. Thus, a large delta may be determined between the unfiltered SONOX measurement signal and the estimated or filtered SONOX value after the long motoring or idling event. Thus, if long a idling event occurs that is followed by a rise in engine-out $NO_x$ and SONOX measurement signals, then the $NH_3$ slip detection can be paused for a predetermined fixed duration responsive to the end of long motoring or idling event. That is, a flag value of 0 (or conversely 1, depending on the implementation) may be set for a variable for a long motor/idle prerequisite.

Another prerequisite condition may include that the SONOX measurement signal is above one or more minimum thresholds. That is, the presence of $NH_3$ slip at the tailpipe would introduce a minimum level of offset to the SONOX measurement signal. Thus, if the SONOX measurement signal is below a predetermined value, then the $NH_3$ slip detection can be paused since there is no or minimal $NH_3$ slip. That is, a flag value of 0 (or conversely 1, depending on the implementation) may be set for a variable for a threshold SONOX prerequisite.

Figure 5:
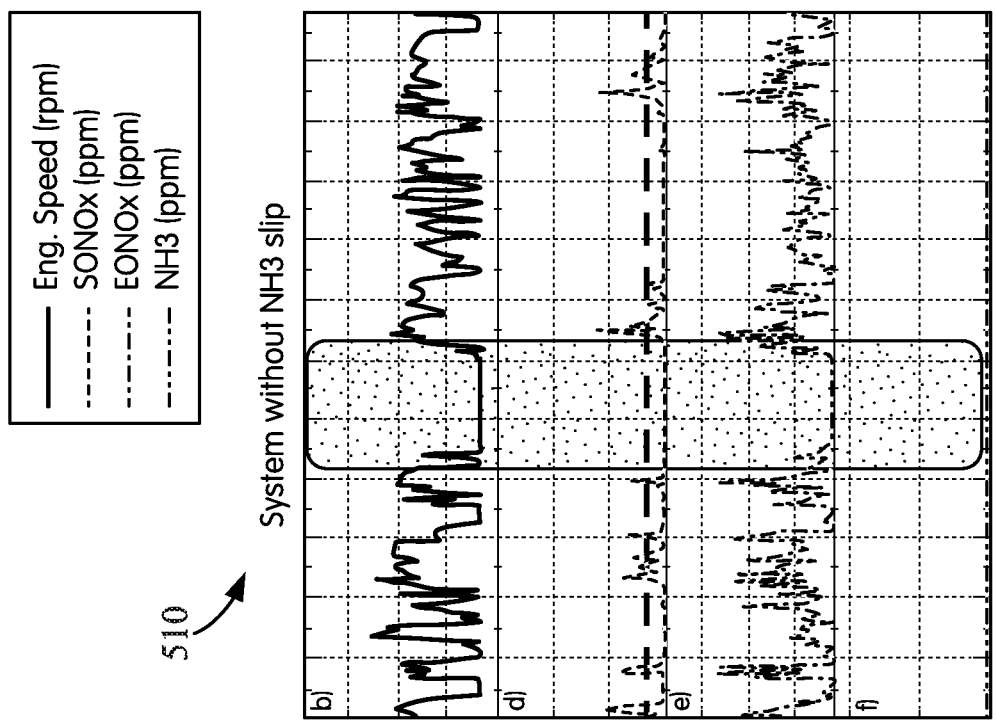
FIG. 5 is a graphical diagram depicting measured SONOX signals at low catalyst temperatures to detect $NH_3$ slip using a system-out $NO_x$ sensor.
Figure 5:
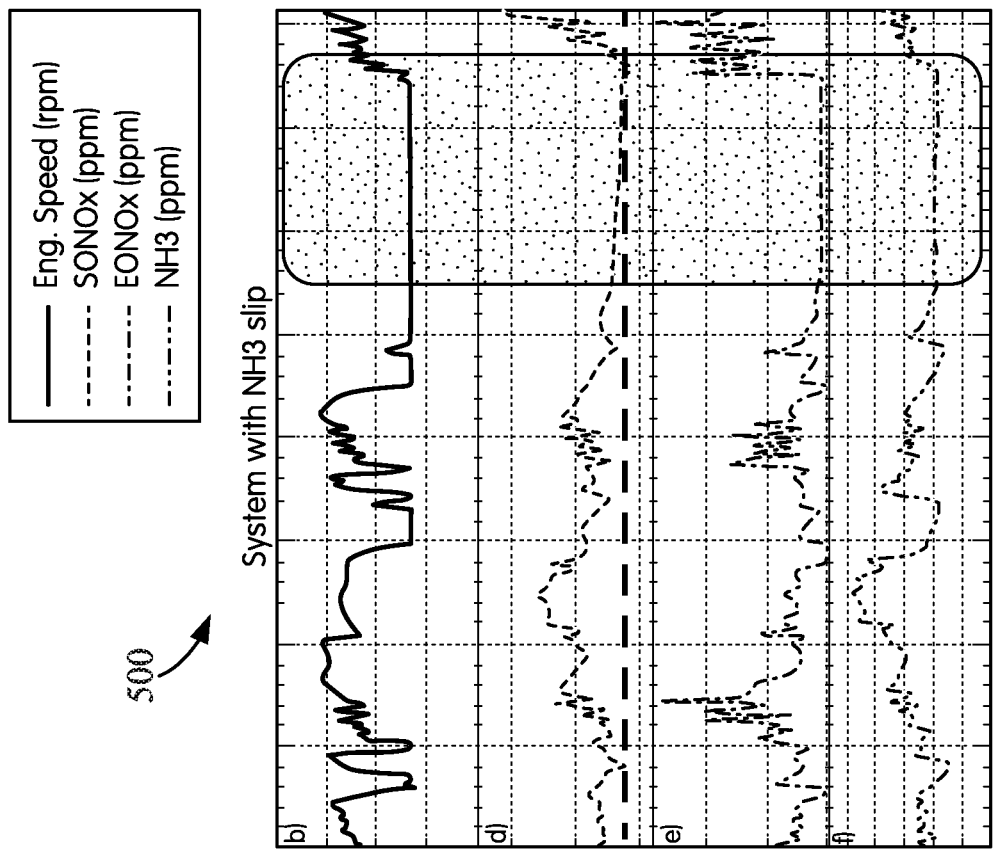

A second method is applicable for when the SCR catalyst has a low temperature, such as below 300° C. SONOX levels are low when the SCR bed temperature is low, such as during motoring/idling events and/or when there is no load, because engine-out $NO_x$ levels are also low. Thus, when the SCR bed temperature drops below a predetermined temperature, then the corresponding SONOX measurement signal also drops to a low or minimal value in a short period of time. If there is residual $NH_3$ in the tailpipe, then the cross-sensitivity of the $NO_x$ sensor towards $NH_3$ will result in a positive offset in the SONOX measurement signal. That is, if there is $NH_3$ slip occurring after the engine enters a motoring/idling or low load event, then the $NO_x$ sensor will detect the $NH_3$ slip as $NO_x$ even though there is minimal engine-out $NO_x$ (and therefore should be minimal measured SONOX). During motoring or idling events for a predetermined period of time, the SONOX measurement signal is stored by the controller for a predetermined period of time. If stored the average of the SONOX measurement signals during this period exceeds a predetermined value after the predetermined period of time since the start of the idling event, then the high SONOX measurement signal is indicative of $NH_3$ slip, as highlighted by 500, as shown in FIG. 5. That is, because engine-out $NO_x$ is at low or minimal levels during the motoring or idling, an elevated SONOX measurement signal is indicative of $NH_3$ slip at the tailpipe.

A prerequisite condition to be met for the low temperature $NH_3$ slip detection may include determining that the SONOX measurement signal differs from the engine-out $NO_x$ measurement signal by a predetermined amount and/or does not correlate well with the engine-out $NO_x$ measurement. As shown in FIG. 5, a system 500 that is slipping $NH_3$ at the tailpipe has a lower degree of cross-correlation between the engine-out $NO_x$ and SONOX measurement signals in comparison to a system 510 that is not slipping $NH_3$. The amount of offset that is introduced by the $NH_3$ slip on the SONOX measurement signal lowers the degree of correlation. Thus if the degree of correlation is persistently higher than expected for a predetermined amount of time, then $NH_3$ slip detection can be paused and/or a flag value of 0 (or conversely 1, depending on the implementation) may be set for a variable for the cross-correlation prerequisite.

FIG. 6 depicts a flow diagram of a process 600 implemented by the controller 120 for the methods described herein. The process 600 includes accessing a temperature value for a catalyst (block 610). Accessing the temperature value for a catalyst can be done by a temperature sensor upstream of a catalyst, downstream of the catalyst, positioned within the catalyst bed, and/or estimated as a virtual temperature based on upstream exhaust conditions.

The process 600 further includes comparing the temperature to a predetermined value, such as 300 degrees Celsius (block 620). If the temperature is above the predetermined value, then the process proceeds to determine if a first set of prerequisite conditions are met (block 630). If the temperature is equal to or below the predetermined value, then the process proceeds to determine if a second set of prerequisite conditions are met (block 632).

The determinations of whether the first set of prerequisite conditions are met can include accessing one or more flag values indicative of the prerequisite conditions being met or not met. The first set of prerequisite conditions may include one or more of the cross-correlation prerequisite, long motor/idle prerequisite, and/or threshold SONOX prerequisite. Determining that the first set of prerequisites are met may involve comparing the flag values to a 0 (or 1 value, depending upon the implementation) to check that the first set of prerequisite conditions are met. If the first set of prerequisite conditions are not met, then the process 600 may end (block 690). If the first set of prerequisites are met, then the process 600 proceeds to accessing a SONOX measurement signal (block 640).

Accessing the SONOX measurement signal (block 640) may include accessing one or more values stored in a storage medium and/or reading an input value from a SONOX sensor. The process 600 determines an estimated SONOX value (block 650) from the accessed SONOX measurement signal (block 640). In some implementations, the estimated SONOX value can be calculated by using a filtered SONOX measurement value from the accessed SONOX measurement signal (block 640). The process 600 includes calculating and storing a delta value (block 660). The delta value can be calculated between the accessed unfiltered SONOX measurement signal (block 640) and one or more estimated SONOX values (block 650). The process 600 further includes determining that the average of one or more delta values is greater than a predetermined value (block 670). In some instances, the average of the one or more delta values is based on a number of delta values over a predetermined period of time. If the average of one or more delta values is greater than the predetermined value, then an $NH_3$ slip flag can be set (block 680) to indicate that $NH_3$ is slipping. If the average of one or more delta values is less than or equal to the predetermined value, then the process ends (block 690).

Returning to comparing the temperature to a predetermined value, such as 300 degrees Celsius (block 620), if the temperature is below the predetermined value, then the process proceeds to determine if a second set of prerequisite conditions are met (block 632). The determinations of whether the second set of prerequisite conditions are met can include accessing one or more flag values indicative of the prerequisite conditions being met or not met. The second set of prerequisite conditions may include the cross-correlation prerequisite. Determining that the second set of prerequisites are met may compare the flag values to a 0 (or 1 value, depending upon the implementation) to check that the second set of prerequisite conditions are met. If the second set of prerequisite conditions are not met, then the process 600 may end (block 690). If the second set of prerequisites are met, then the process 600 proceeds to accessing a SONOX measurement signal (block 642).

Accessing the SONOX measurement signal (block 642) may include accessing one or more values stored in a storage medium and/or reading an input value from a SONOX sensor. The process 600 determines if an average of one or more of the accessed SONOX measurement signal values is greater than a predetermined value (block 672). In some instances, the average of the one or more of the accessed SONOX measurement signal values is based on a number of the accessed SONOX measurement signal values over a predetermined period of time. If the average of one or more of the accessed SONOX measurement signal values is greater than the predetermined value, then an $NH_3$ slip flag can be set (block 680) to indicate that $NH_3$ is slipping. If the average of one or more of the accessed SONOX measurement signal values is less than or equal to the predetermined value, then the process ends (block 690).

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

As utilized herein, "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled" and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method for detecting $NH_3$ slip using a system-out $NO_x$ sensor comprising:
   accessing a temperature value for a catalyst;
   when the temperature value for the catalyst exceeds a predetermined temperature value and one or more first prerequisite conditions are met:
      accessing a plurality of system-out $NO_x$ measurement signals from the system-out $NO_x$ sensor that is disposed downstream of the catalyst,
      determining a plurality of estimated system-out $NO_x$ values,
      calculating a plurality of delta values over a first predetermined period of time, based on the system-out $NO_x$ measurement signals and the estimated system-out $NO_x$ values, and
      setting a flag indicative of $NH_3$ slip for an exhaust system responsive to an average of the plurality of delta values exceeding a first predetermined value; and
   when the temperature value for the catalyst is below the predetermined temperature value and one or more second prerequisite conditions are met:
      accessing a plurality of system-out $NO_x$ measurement signals over a second predetermined period of time,
      calculating an average of the plurality of system-out $NO_x$ measurement signals, and
      setting the flag indicative of $NH_3$ slip for the exhaust system responsive to the calculated average of the plurality of system-out $NO_x$ measurement signals exceeding a second predetermined value.

2. The method of claim 1, wherein the one or more first prerequisite conditions include determining a correlation between the system-out $NO_x$ measurement signal and an engine-out $NO_x$ measurement signal.

3. The method of claim 1, wherein the one or more first prerequisite conditions include determining a motoring or idling event has not occurred.

4. The method of claim 1, wherein the one or more first prerequisite conditions include the system-out $NO_x$ measurement signal exceeding a predetermined value.

5. The method of claim 1, wherein determining the estimated system-out $NO_x$ value is based on a filtered system-out $NO_x$ measurement signal.

6. The method of claim 1, wherein the predetermined temperature value is 300 degrees Celsius.

7. The method of claim 1, wherein calculating the delta value comprises a difference between the system-out $NO_x$ measurement signal and the estimated system-out $NO_x$ value.

8. The method of claim 1, wherein the second one or more prerequisite conditions include determining a correlation between the system-out $NO_x$ measurement signal and an engine-out $NO_x$ measurement signal.

9. The method of claim 1, wherein the predetermined temperature value is 300 degrees Celsius.

10. The method of claim 1, wherein the plurality of system-out $NO_x$ measurement signals are received from the system-out $NO_x$ sensor.

11. A system comprising:
    an exhaust aftertreatment system comprising a catalyst, and a system-out $NO_x$ sensor disposed downstream of the catalyst; and
    a controller configured to:
       access a temperature value for the catalyst;
       when the temperature value for the catalyst exceeds a predetermined temperature value and one or more first prerequisite conditions are met:
          access a plurality of system-out $NO_x$ measurement signals from the system-out $NO_x$ sensor,
          determine a plurality of estimated system-out $NO_x$ values,
          calculate a plurality of delta values over a first predetermined period of time, based on the system-out $NO_x$ measurement signals and the estimated system-out $NO_x$ values, and
          set a flag indicative of $NH_3$ slip for an exhaust system responsive to an average of the plurality delta values exceeding a first predetermined value; and
       when the temperature value for the catalyst is below the predetermined temperature value and one or more second prerequisite conditions are met:
          access a plurality of system-out $NO_x$ measurement signals over a second predetermined period of time,
          calculate an average of the plurality of system-out $NO_x$ measurement signals, and
          set the flag indicative of $NH_3$ slip for the exhaust system responsive to the calculated average of the plurality of system-out $NO_x$ measurement signals exceeding a second predetermined value.

12. The system of claim 11, wherein the one or more first prerequisite conditions include determining a correlation between the system-out $NO_x$ measurement signal and an engine-out $NO_x$ measurement signal.

13. The system of claim 11, wherein the one or more first prerequisite conditions include determining a motoring or idling event has not occurred.

14. The system of claim 11, wherein the one or more first prerequisite conditions include the system-out $NO_x$ measurement signal exceeding a predetermined value.

15. The system of claim 11, wherein determining the estimated system-out $NO_x$ value is based on a filtered system-out $NO_x$ measurement signal.

16. The system of claim 11, wherein calculating the delta value comprises a difference between the system-out $NO_x$ measurement signal and the estimated system-out $NO_x$ value.

17. The system of claim 11, wherein the one or more second prerequisite conditions include determining a correlation between the system-out $NO_x$ measurement signal and an engine-out $NO_x$ measurement signal.

18. The system of claim 11, wherein the predetermined temperature value is 300 degrees Celsius.

\* \* \* \* \*